(12) United States Patent
Ubbesen

(10) Patent No.: US 9,814,251 B2
(45) Date of Patent: Nov. 14, 2017

(54) ARRANGEMENT AND METHOD FOR MIXING OF PARTICULATE FILLING INTO CONSUMER ICE MASS

(71) Applicant: Tetra Laval Holdings & Finance S.A., Pully (CH)

(72) Inventor: Jonas Ubbesen, Åby-Höj (DK)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/368,854

(22) Filed: Dec. 5, 2016

(65) Prior Publication Data

US 2017/0079306 A1    Mar. 23, 2017

Related U.S. Application Data

(62) Division of application No. 14/386,356, filed as application No. PCT/EP2013/054684 on Mar. 8, 2013, now abandoned.

(30) Foreign Application Priority Data

Mar. 22, 2012  (DK) .................................. 2012 70131

(51) Int. Cl.
   *B01F 7/00*    (2006.01)
   *A23G 9/22*    (2006.01)
   (Continued)

(52) U.S. Cl.
   CPC ............... *A23G 9/224* (2013.01); *A23G 9/24* (2013.01); *B01F 3/14* (2013.01); *B01F 5/0471* (2013.01);
   (Continued)

(58) Field of Classification Search
   CPC .............................. B01F 7/002; A23G 9/224
   (Continued)

(56) References Cited

U.S. PATENT DOCUMENTS 19,581 A    3/1858    Pierce
787,988 A   4/1905    Moore
(Continued)

FOREIGN PATENT DOCUMENTS

EP    1731040    12/2006
FR    440750    7/1912
(Continued)

OTHER PUBLICATIONS

International Search Report in PCT/EP2013/054684, dated May 27, 2013 (3 pages).

*Primary Examiner* — David Sorkin
(74) *Attorney, Agent, or Firm* — Finnegan, Henderson, Farabow, Garrett & Dunner, L.L.P.

(57) ABSTRACT

An arrangement is disclosed for mixing of particulate filling material into a consumer ice mass. The arrangement includes a rotor cylinder having: a first rotor blade, a second rotor blade and a third rotor blade for the mixing-in of the consumer ice mass and the particulate filling material by rotation, wherein: the first rotor blade has a first notch configured to accommodate the second blade and the third blade, and a second notch configured to accommodate the front bearing, the second rotor blade has a first notch configured to accommodate the first rotor blade, a second notch configured to accommodate the third blade, and a third notch configured to accommodate the front bearing, and the third rotor blade has a first notch configured to accommodate the first rotor blade and the second rotor blade, and a second notch configured to accommodate the front bearing.

18 Claims, 12 Drawing Sheets

Figure 1:
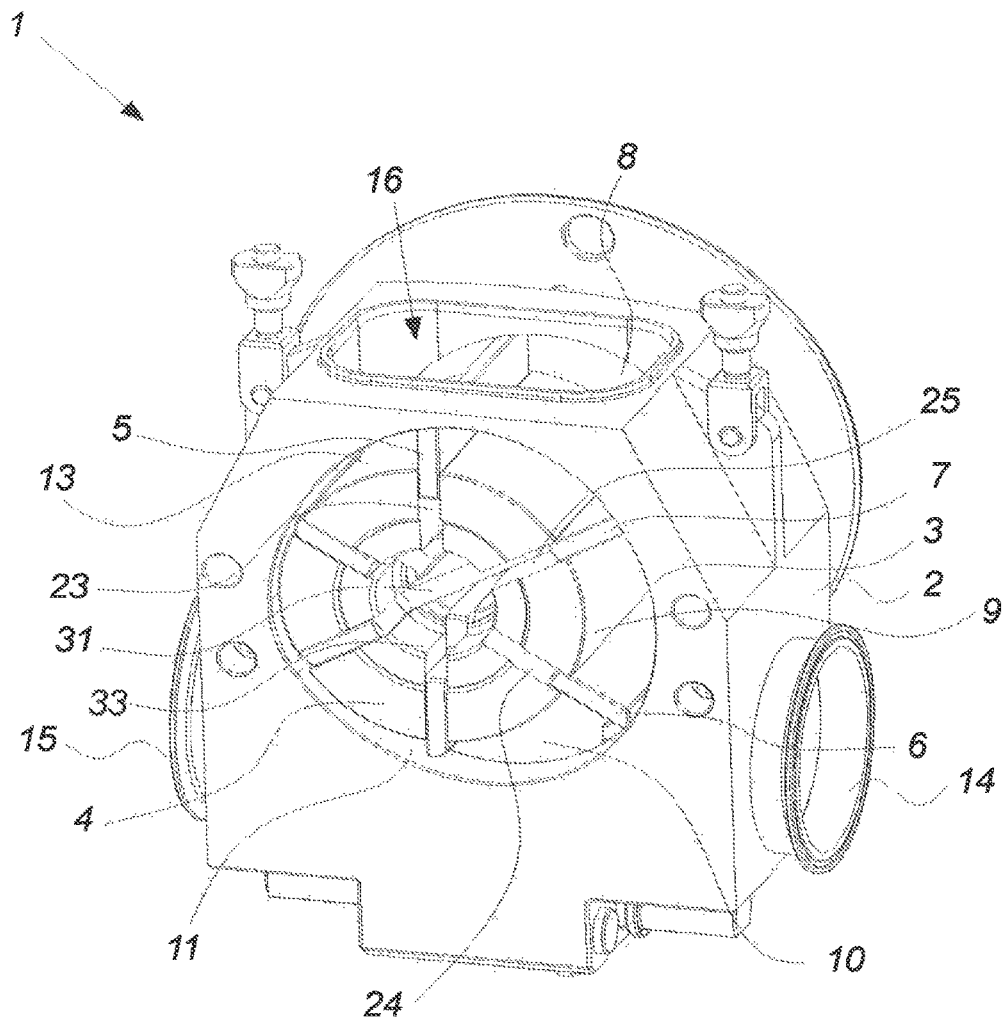

(51) Int. Cl.
    *B01F 5/04*     (2006.01)
    *B01F 15/02*     (2006.01)
    *B01F 3/14*     (2006.01)
    *A23G 9/24*     (2006.01)

(52) U.S. Cl.
    CPC ............ *B01F 7/002* (2013.01); *B01F 7/0025* (2013.01); *B01F 15/026* (2013.01); *A23V 2002/00* (2013.01); *B01F 2215/0021* (2013.01)

(58) Field of Classification Search
    USPC .......................... 418/225, 255; 366/262, 331
    See application file for complete search history.

(56) References Cited

U.S. PATENT DOCUMENTS

| | | |
|---|---|---|
| 1,046,791 A | 12/1912 | Inhulsen |
| RE22,150 E | 8/1942 | Davis |
| 2,344,964 A * | 3/1944 | Brennan ............... F04C 2/3441 418/255 |
| 3,201,034 A | 8/1965 | Ryffel |
| 3,260,210 A | 7/1966 | Gram |
| T86,300,914 | 6/1969 | Colley et al. |
| 4,746,280 A | 5/1988 | Wystemp et al. |
| 5,102,314 A | 4/1992 | Staudenrausch |
| 5,743,639 A | 4/1998 | Puerner |
| 8,573,828 B2 | 11/2013 | Qu |
| 2006/0280635 A1 | 12/2006 | Bohn et al. |

FOREIGN PATENT DOCUMENTS

| | | |
|---|---|---|
| JP | U 58-077176 | 5/1983 |
| JP | 2004-529283 | 9/2004 |
| JP | 2009-209837 | 9/2009 |
| JP | 2011-127582 | 6/2011 |
| WO | WO 91/17819 | 11/1991 |

* cited by examiner

ARRANGEMENT AND METHOD FOR MIXING OF PARTICULATE FILLING INTO CONSUMER ICE MASS

CROSS-REFERENCE TO RELATED APPLICATIONS

This application is a divisional of U.S. application Ser. No. 14/386,356, filed on Sep. 19, 2014, which is a U.S. National Stage Entry of International Application No. PCT/EP2013/054684, filed Mar. 8, 2013, which claims the benefit of priority to Denmark Patent Application No. PA 2012 70131, filed Mar. 22, 2012. The contents of the above-referenced applications are expressly incorporated herein by reference.

SCOPE OF THE INVENTION

The present invention relates to an arrangement and a method for mixing of particulate filling, such as pieces of nougat or fruit, into consumer ice mass under pressure.

PRIOR ART

It is desirable that such a mixing-in is carried out "in-line", i.e. with the addition of the filling to a flow of already air-puffed-up ice mass which is conveyed under pressure, e.g. from a through-flow freezer or cooler, and it is naturally necessary that the filling shall be distributed in the ice mass in a more or less uniform manner.

In the solving of this task, use may be made of an apparatus unit of the vane-pump type, i.e. with a pump housing having a cylinder-like cavity and an eccentrically positioned and bearing supported rotor cylinder with a number of diametrically through-going lamella blades which are freely displaceable in their longitudinal direction.

The inner side of the pump housing forming the cavity has a curved geometry, which is formed so that both ends of the lamella blades will follow the surface of the cavity and form a substantially tight sealing during rotation of the eccentrically position rotor cylinder. This results in a cross-sectional shape of the cavity, which at a first glance may appear circular but is in fact not a strict circle. This is the reason for the expression "cylinder-like cavity", which is used throughout this document.

Near an outlet opening of the pump housing, the rotor cylinder itself tightens more or less effectively against the inner side of the pump housing so that the rotor blades here will be pressed completely into the rotor, while, on the opposite side of this, they will be pushed out to a maximum for continued tightening against the inner side of the pump housing near the inlet side of this housing. During the rotation of the rotor, the rotor blades will be pushed forwards and backwards by their interaction with the inner side of the pump housing during maintenance of the sealing against this.

With the use of such a unit, it is possible to arrange a supply of filling from above by feeding the filling material to an empty upper cell chamber just before this is rotated downwards for the receipt of the ice mass at the input side of the unit. When this connection is opened by the rotation of the rotor, the ice mass flowing in will swirl up into and be mixed with the filling particles, and soon thereafter the rearmost rotor blade in the direction of rotation will close for further flow into the more or less filled cell, which is then transported over to the outlet side of the pump.

BRIEF DESCRIPTION OF THE INVENTION

It is an object of the present invention to provide an arrangement and method for mixing of particulate filling into consumer ice mass under pressure with improved life time of wearing parts and improved mechanical stability as compared to solutions known in the art.

The present invention relates to an arrangement for mixing of particulate filling material, such as pieces of nougat or fruit, into a consumer ice mass, said arrangement comprising a housing with at least one supply opening for the consumer ice mass, at least one inlet for the filling material to a cavity in the housing, an outlet opening and a rotor cylinder with one or more rotor blades for the mixing-in of the consumer ice mass and filling material by rotation, wherein the rotor blades create a number of cells in the cavity by being pressed against the surface of the cavity, and wherein the rotor cylinder is supported from two opposing sides of the cavity by bearings in the form of a rear bearing and a front bearing, respectively.

A configuration like this with a front bearing as well as a rear bearing allows for a significantly better stability of the rotor cylinder during operation of the arrangement than is the case in similar arrangements known in the art.

In an embodiment of the invention, at least a part of the front bearing protrudes into the rotor cylinder and into notches in each of the rotor blades.

By letting the front bearing protrude into the rotor cylinder and into notches of the rotor blades, it is possible to increase the width of the rotor blades to overlap at least a part of the front bearing, thereby increasing the surface area and reducing the wear of the rotor blades.

In an embodiment of the invention, the the centre of the rotor is displaced in relation to the centre of the cavity.

In a further embodiment of the invention, the centre of the rotor is displaced horizontally in relation to the at least one inlet.

In an embodiment of the invention, the rotor blades consist of two plates mutually displaced by 90 degrees or three plates mutually displaced by 60 degrees.

These are all well-proven and reliable ways of configuring an arrangement for the given purpose.

In an aspect of the invention, it relates to a rotor blade for being used in a rotor cylinder of an arrangement for mixing of particulate filling material into a consumer ice mass, said rotor blade comprising at least one front bearing notch in a front-side edge of the rotor blade, which notch is suitable for accommodating at least a part of a front bearing of the arrangement protruding into the rotor cylinder while allowing the rotor blade to slide forth and back in its longitudinal direction during operation of the arrangement.

In an embodiment of the invention, the rotor blade further comprises at least one front-side notch and/or at least one rear-side notch, the length(s) of which notch(es) correspond(s) substantially to the movement of the rotor blade in the longitudinal direction during operation of the arrangement.

The use of such notches allows a set of rotor blades to interact with each other and allow each other to move forth and back in their longitudinal directions during operation of the arrangement.

In an embodiment of the invention, the width of a connection piece at the same longitudinal position as the notches is less than one third of the full width of the rotor blade.

This makes room for at least connection pieces of two or typically three rotor blades within the rotor blade width not "consumed" by the front bearing notch.

In an embodiment of the invention, the rotor blade further comprises one or more through-going openings for the creation of one or more openings through the rotor blade.

Such openings allow air, which would otherwise be encapsulated between two rotor blades to move through the rotor blade. In this way, the formation of air pockets in the ice mass leaving the arrangement may be avoided.

In an embodiment of the invention, the one or more through-going openings are recesses or holes in the rotor blade.

These are simple and reliable ways of making openings through the rotor blade.

In an embodiment of the invention, the one or more through-going openings are placed at or in the vicinity of transverse edges (29) of the notch(es) or at or in the vicinity of the outermost transverse edges of the rotor blade.

These placements of the openings are advantageous for use in certain embodiments of the type of arrangements for which the rotor blades are intended.

In an embodiment of the invention, the end surfaces of the rotor blade are rounded so that the shape of each end surface corresponds to a part of a cylindrical surface.

Rounding the end surfaces results in a larger "effective" area of the end surfaces when they slide against the inner side of a cavity of an arrangement for mixing particulate filling material into a consumer ice mass, thereby reducing the wear on the rotor blades.

In an embodiment of the invention, the width of the rotor blade, corresponding to the length of an outermost transverse edge thereof, exceeds the width of the inlet for filling material of the arrangement, in which the blade is to be used, in the direction parallel to the rotational axis of the rotor cylinder by more than 22%, preferably by more than 30%, most preferred by more than 40%.

By letting the width of the rotor blade exceed the width of the inlet by percentages according to the specified ranges, it is obtained that the upward pressure from the ice mass upon the rotor blades results in significantly less wear of the rotor blades than is known from similar arrangements known in the art.

In an aspect of the invention, it relates to a method for mixing of particulate filling material, such as pieces of nougat or fruit, into a consumer ice mass by an arrangement as described above.

THE DRAWINGS

Figure 2:
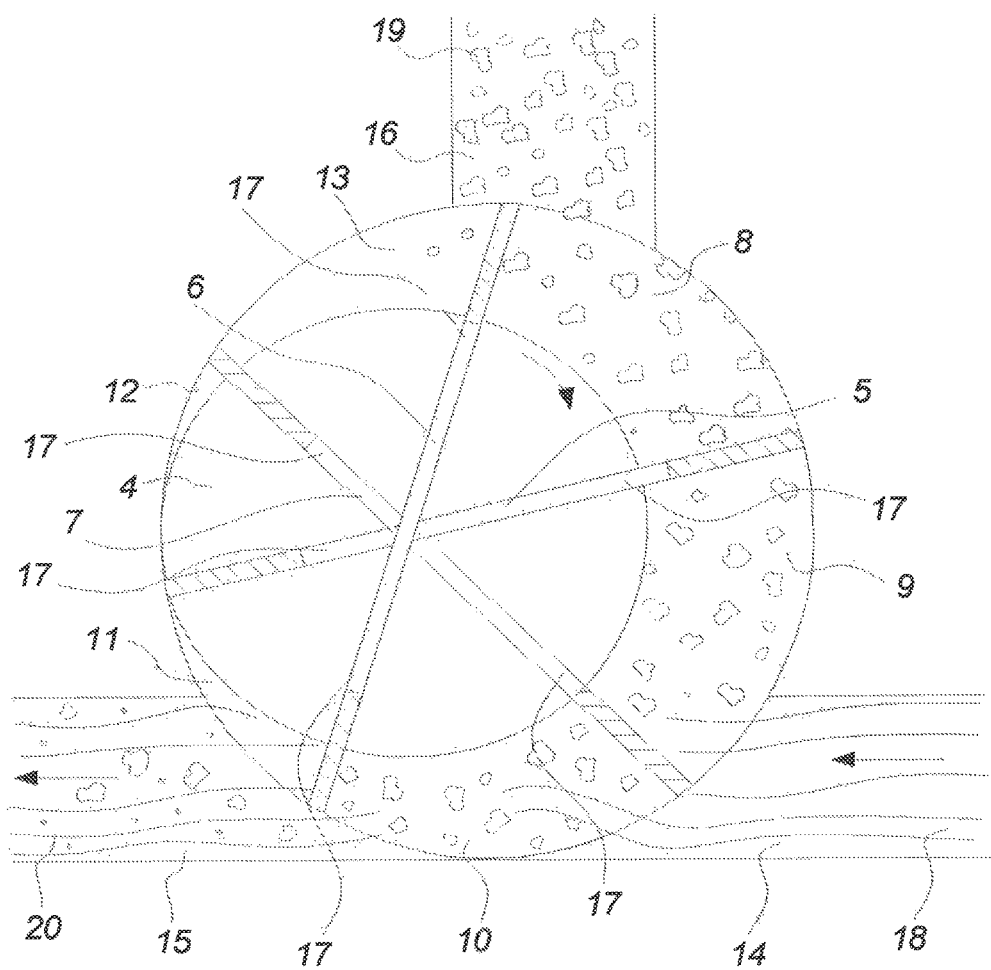
Figure 3:
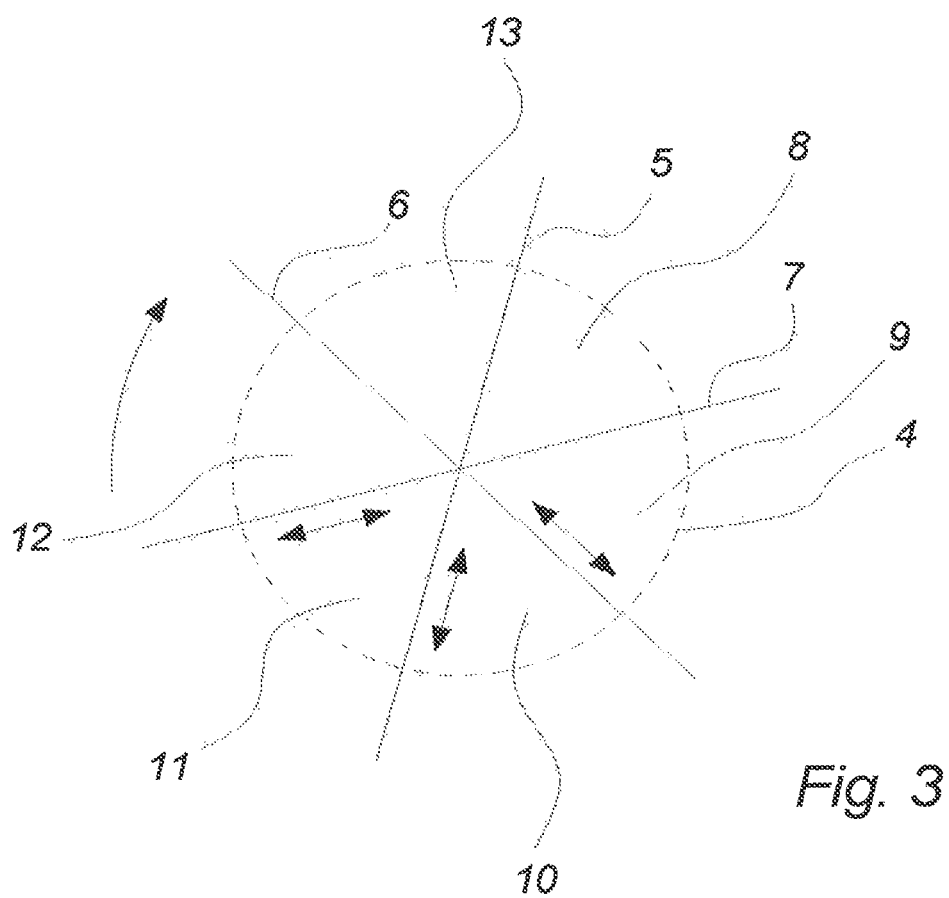
Figure 4:
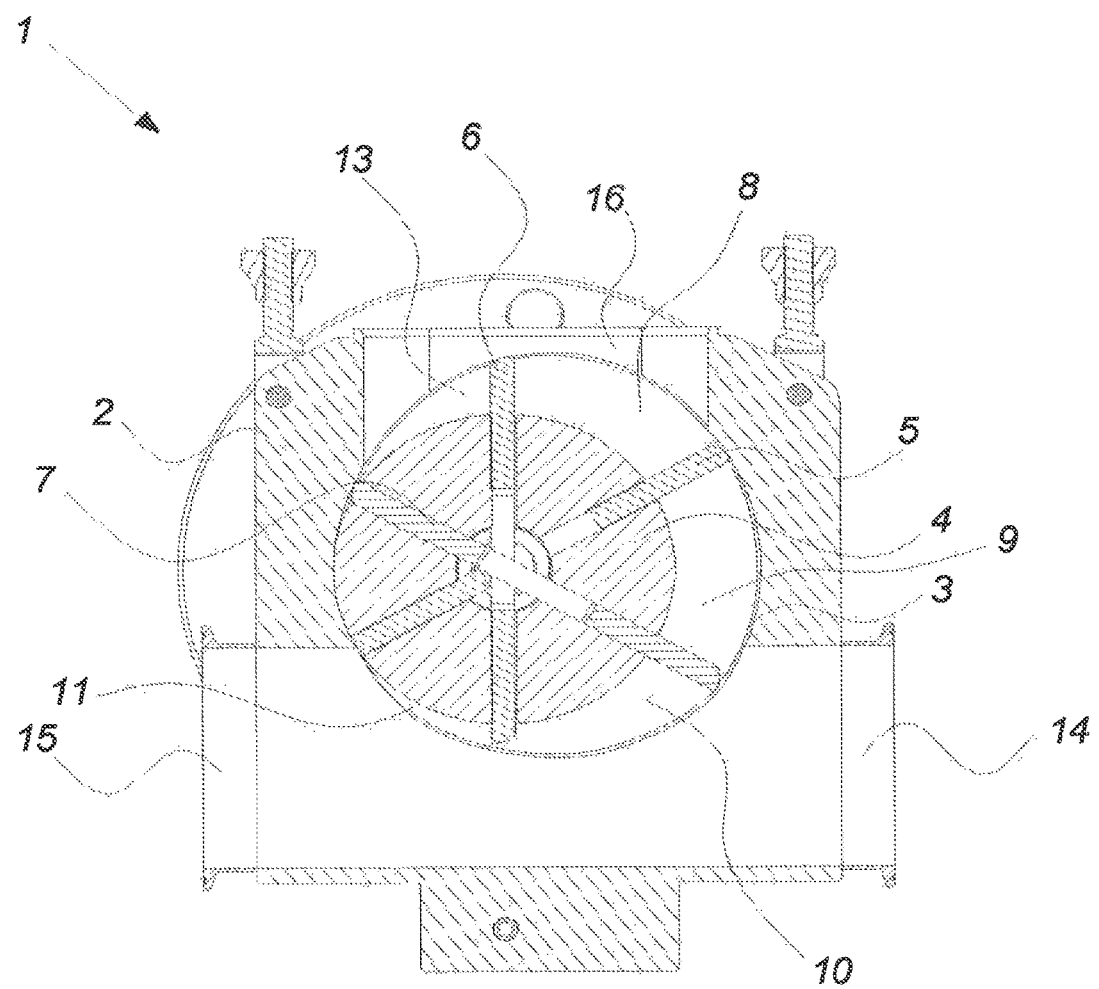
Figure 5:
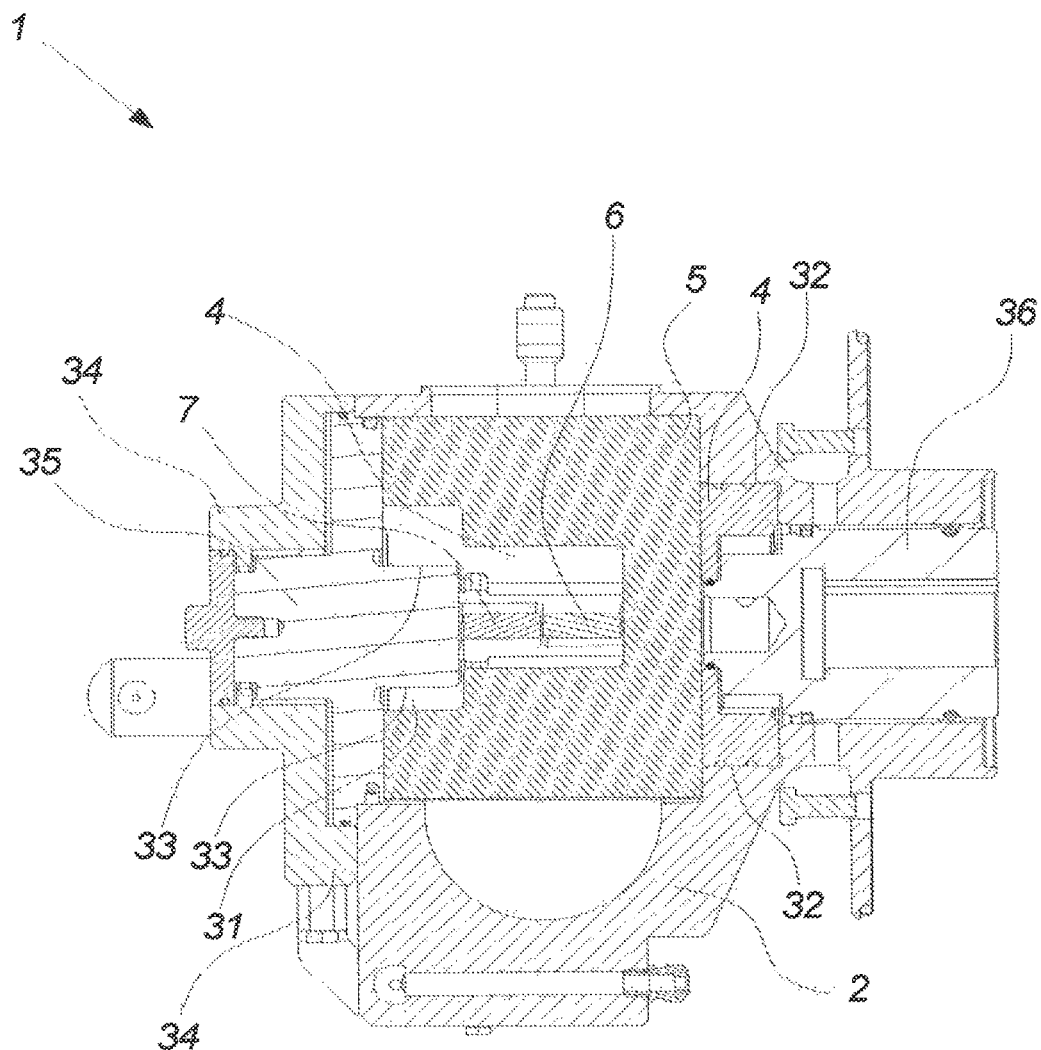
Figure 6A:
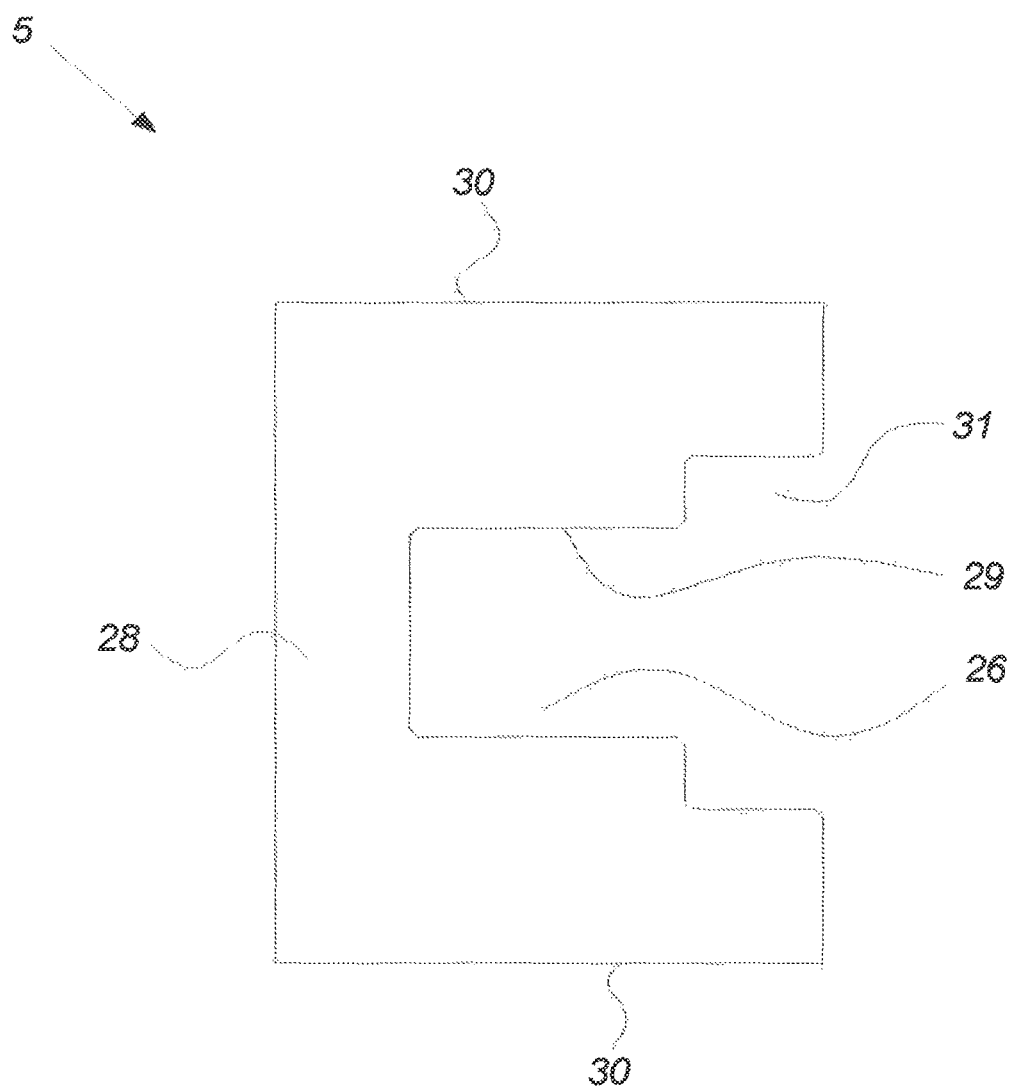
Figure 6B:
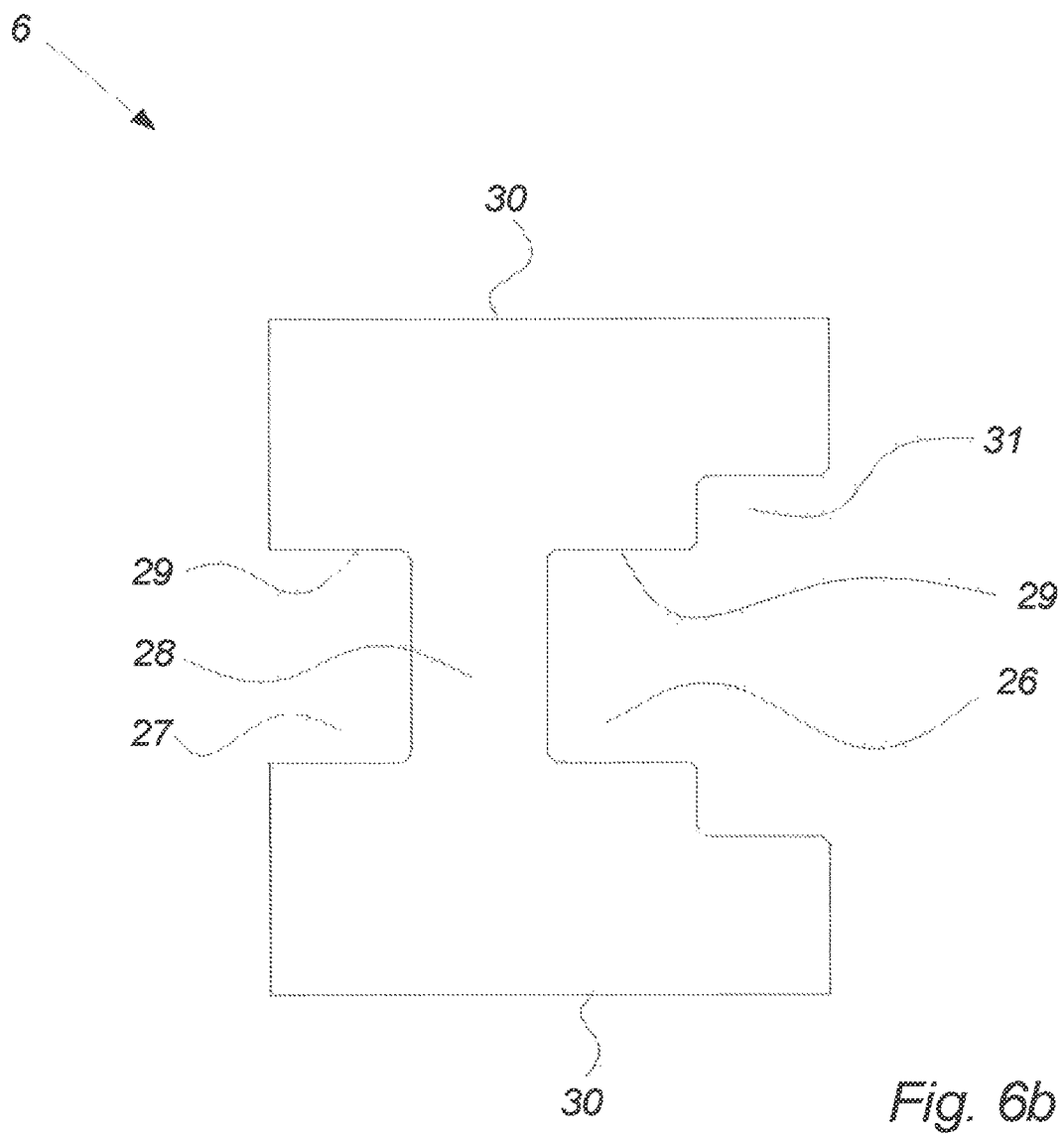
Figure 6C:
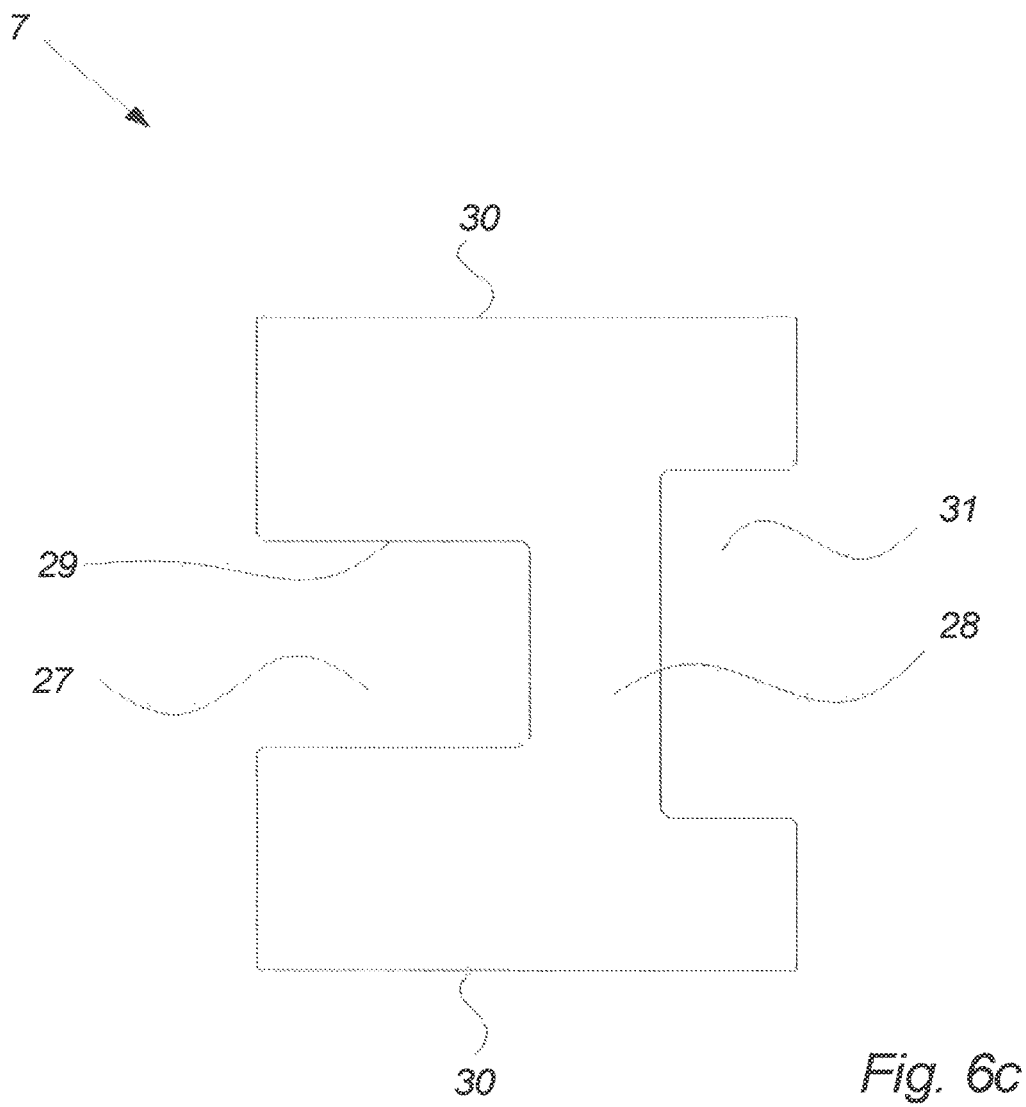
Figure 7:
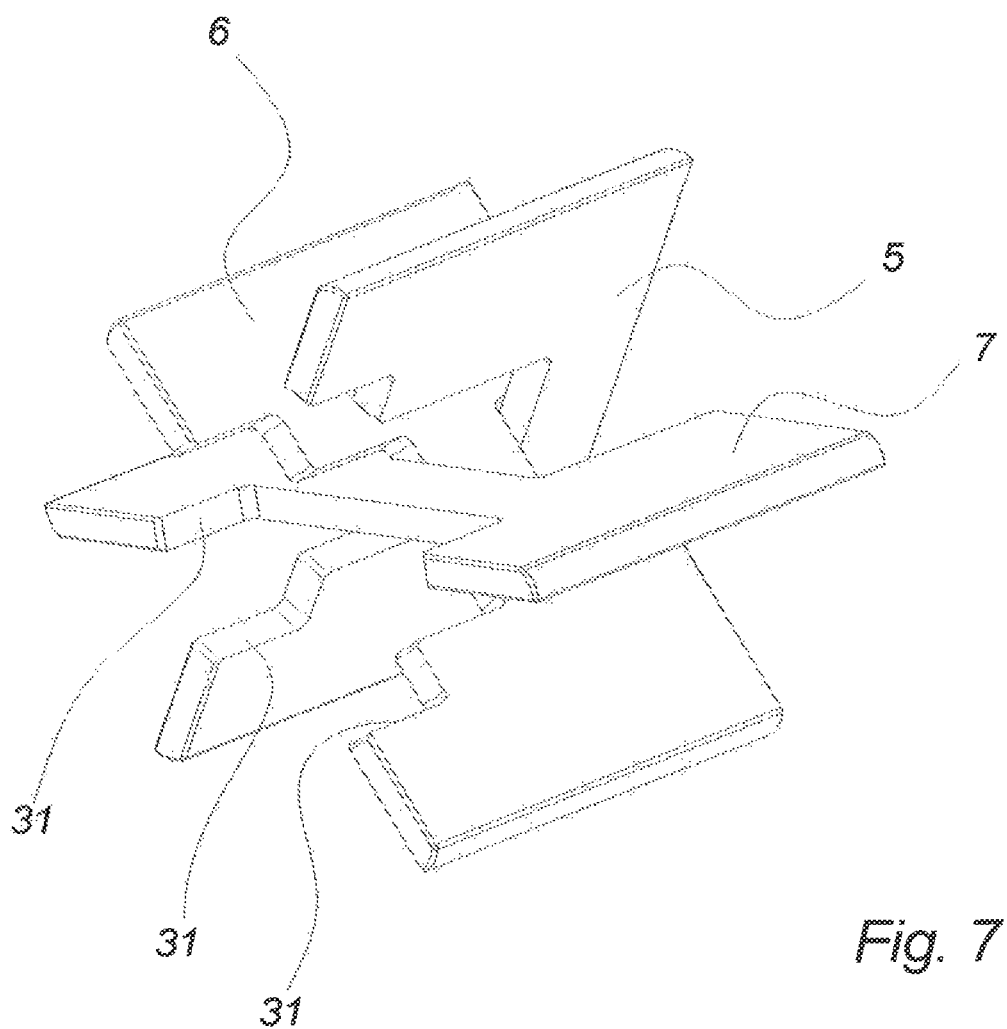
Figure 8C:
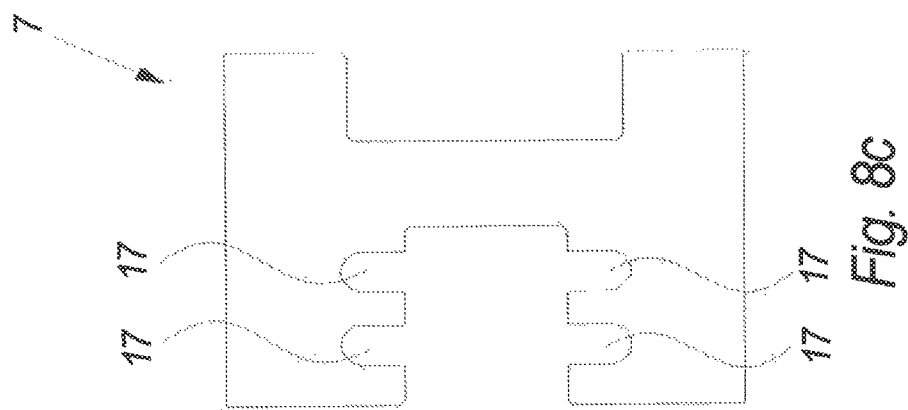
Figure 8B:
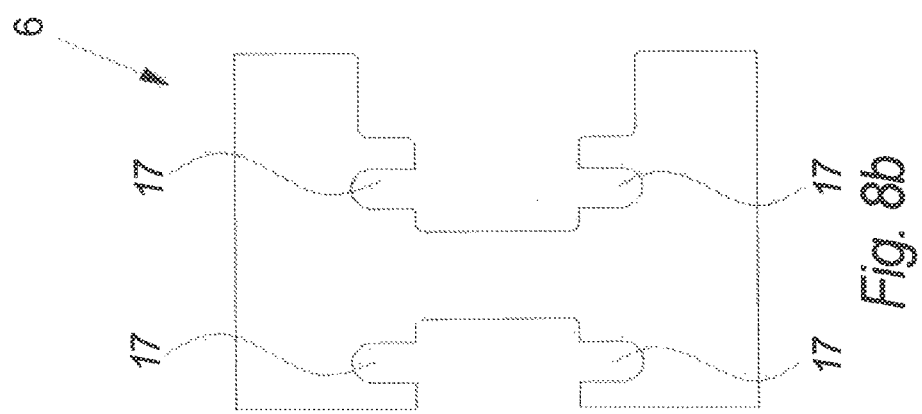
Figure 8A:
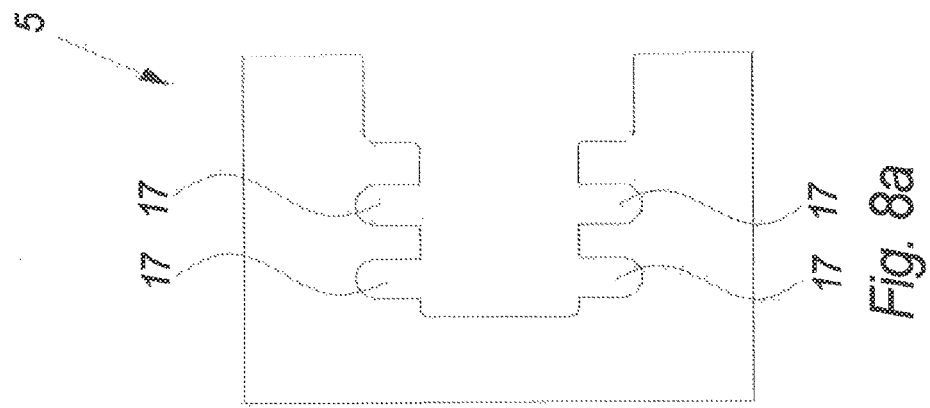
Figure 9A:
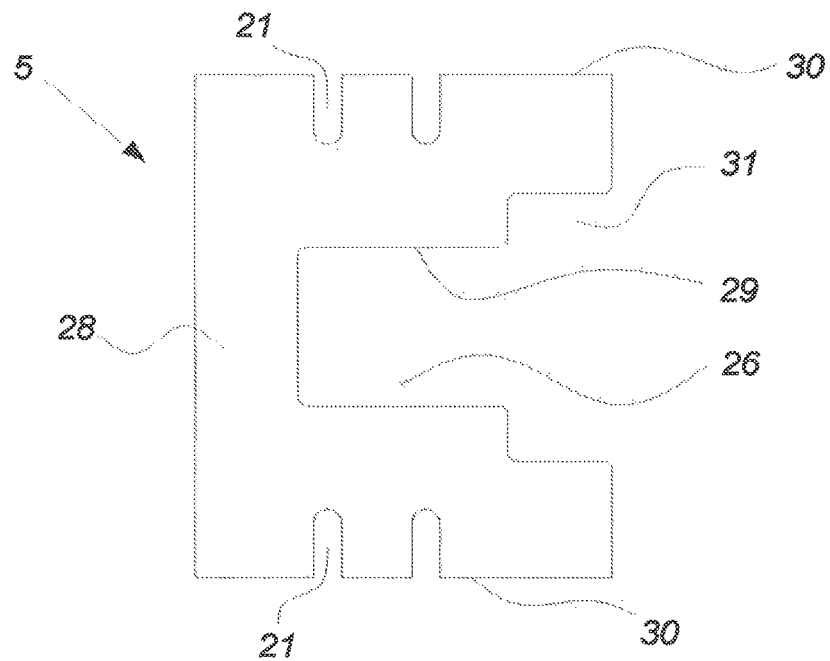
Figure 9B:
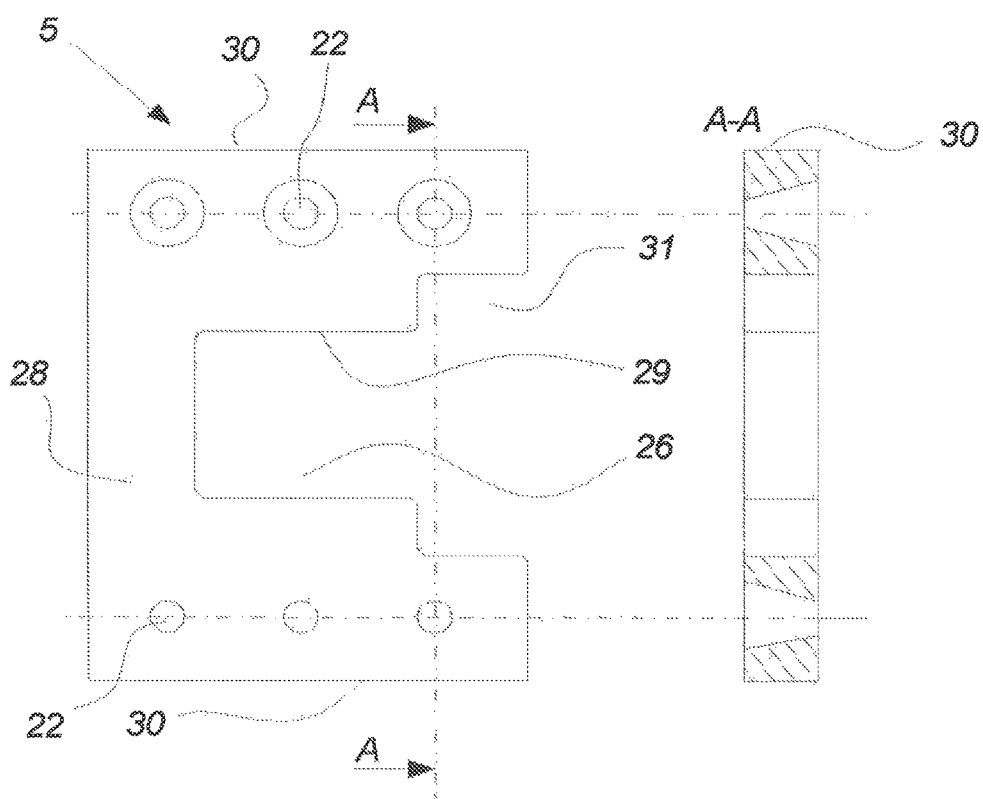
Figure 10:
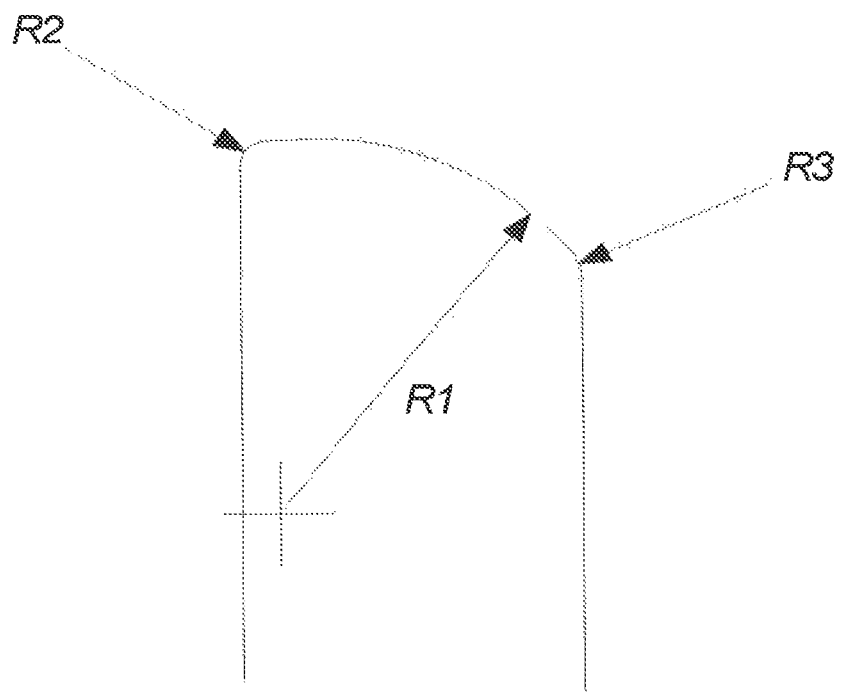

In the following, a few exemplary embodiments of the invention will be explained in more detail with reference to the drawing, in which FIG. 1 illustrates a perspective view of an arrangement according to an embodiment of the invention for mixing of particulate filling into a consumer ice mass, FIG. 2 illustrates schematically the function of a similar arrangement as known in the art, FIG. 3 illustrates schematically the movements of a set of rotor blades assembled in a rotor of a similar arrangement as known in the art, FIG. 4 illustrates a longitudinal cross-sectional view through the middle part of the arrangement shown in FIG. 1, FIG. 5 illustrates a transversal cross-sectional view through the centre of the rotor of the arrangement shown in FIG. 1, FIG. 6a illustrates the contour of a first embodiment of a first rotor blade of an arrangement according to the invention, FIG. 6b illustrates the contour of a first embodiment of a second rotor blade of an arrangement according to the invention, FIG. 6c illustrates the contour of a first embodiment of a third rotor blade of an arrangement according to the invention, FIG. 7 illustrates the mechanical interactions of the three rotor blades shown in FIGS. 6a-6c, FIG. 8a illustrates the contour of a second embodiment of a first rotor blade of an arrangement according to the invention, FIG. 8b illustrates the contour of a second embodiment of a second rotor blade of an arrangement according to the invention, FIG. 8c illustrates the contour of a second embodiment of a third rotor blade of an arrangement according to the invention, FIG. 9a illustrates the contour of a third embodiment of a first rotor blade of an arrangement according to the invention, FIG. 9b illustrates the contour of a fourth embodiment of a first rotor blade of an arrangement according to the invention, and FIG. 10 illustrates the rounding of the end surface of a rotor blade according to an embodiment of the invention.

DETAILED DESCRIPTION OF THE INVENTION

The arrangement 1 shown in FIG. 1 for mixing of particulate filling 19 such as pieces of nougat or fruit into a consumer ice mass 18 consists of a stator housing 2 with a cylinder-like cavity 3, in which an eccentrically positioned and bearing supported rotor cylinder 4 is placed, which rotor cylinder 4 has three diametrical through-going rotor blades 5-7. These plates 5-7 are displaceable in their longitudinal direction in a well-known manner, so that during rotation of the rotor 4, they will seal more or less effectively against the curved surface defining the cylinder-like cavity 3, hereby forming cells 8-13 between successive rotor blades 5-7. In the right-hand side of the stator housing 2 as illustrated in FIG. 1, a supply opening 14 for ice mass 18 is arranged. In the top of the stator housing 2 is an inlet opening 16 for the introduction from above of loose filling material 19 mixed with air, and in the left-hand side of the stator housing 2, an outlet opening 15 for ice mass with mixed-in filling material 20 is provided.

In FIG. 1, the front cover 34 and the front bearing block 35 have been removed for the sake of visibility. It can be seen how notches 31 in the three rotor blades 5-7 makes room for a part of the front bearing block 35 to be inserted into the rotor cylinder 4 for supporting it from the front side of the arrangement 1.

In FIG. 2, said cells between the rotor blades 5-7 are designated 8-13, and the cycle of operations in the arrangement 1 can briefly be described as follows:

During the forward rotation of the cell 8 past the inlet opening 16, this cell will be more or less filled with filling material 19. The cells 9 and 10 are both in the process of passing the supply opening 14 for ice mass, i.e. they both receive in-flowing ice mass 18. Concurrently, the cell 10 is in the process of opening towards the outlet opening 15, and the cell 11 has already emptied the most of its content to the outlet opening 15.

The filling material 19 in the cell 9 will be pushed slightly upwards by the in-flowing ice mass 18, and will be mixed into this mass 18 only to a small degree. When this cell is turned down towards the position of the cell 10, the lamella blade 5 rearmost in the direction of rotation will force the filling material 19 down into the ice mass 18, and with suitable dimensioning and operational conditions it can be achieved that the filling material 19 is mixed into the ice mass 18 with the necessary uniformity.

FIG. 3 illustrates schematically the movements of a set of rotor blades 5-7 assembled in a rotor cylinder 4 of an arrangement 1 of this kind. It is indicated how the rotor blades 5-7 slide individually in their longitudinal directions during rotation of the rotor cylinder 4.

The figure shows that six cells 8-13 are formed between the rotor blades 5-7, which form mutual angles corresponding to 60 degrees. In alternative embodiments, the three rotor blades 5-7 can be replaced with only two rotor blades being arranged with their longitudinal axes perpendicular to each other.

FIG. 4 illustrates a longitudinal cross-sectional view through the middle part of the arrangement 1 shown in FIG. 1 and shows the actual positions and mutual relations of the elements of the arrangement 1 interacting to perform the operations as described above in relation to FIG. 2.

FIG. 5 illustrates a transversal cross-sectional view through the centre of the rotor of the arrangement shown in FIG. 1. In view, it is seen how the rotor cylinder 4 is supported both from the back side and from the front side by a cylindrical rear bearing surface 32 and a cylindrical front bearing surface 33, respectively. This is unlike similar arrangements 1 known in the art, in which the rotor cylinder 4 is normally only supported by a single cylindrical bearing surface corresponding to the rear bearing surface 32 of the present invention. Thus, in the illustrated embodiment, the rear bearing and the front bearing do not comprise any ball bearings or the like. Rather, each of them consists of two cylindrical surfaces 32, 33 sliding against each other. Lubrication channels may be formed in one or both of these surfaces 32, 33.

The rear bearing surface 32 is physically positioned behind the rotor blades 5-7, which configuration is similar to the solutions known in the art.

The front bearing surfaces 33, on the other hand, involves a front bearing block 35 protruding into the rotor cylinder 4 and into the notches 31 in each of the rotor blades 5-7, which are also illustrated in FIG. 1. The front bearing block 35 is held in place by the front cover 34. The front cover 34 and the front bearing block 35 are constructed so that the front bearing block 35, guided by one or more guide pins (not shown), may be withdrawn by a few millimeters from the rotor cylinder 4 without loosening the front cover, thus allowing cleaning liquid to enter the rotor cylinder assembly 4-7 for cleaning all the surfaces thereof during so-called "cleaning-in-place" procedures. This movement of the front bearing block 35 may be done by pneumatic activation, for instance by means of an applied vacuum.

Generally, the stator housing 2 is made deeper than the stator housings of similar arrangements known in the art for similarly dimensioned supply openings 14 for consumer ice mass 18, outlet openings 15 and inlets 16 for filling material 19. At least two advantages are obtained by increasing the depth of the stator housing 2.

Firstly, it makes room for the front bearing block 35 while keeping the width of the connection pieces 28 of the rotor blades 5-7 (see FIGS. 6a-6c) at a sufficient level for securing the stability and the durability of the rotor blades 5-7. The introduction of a front bearing significantly increases the stability of the rotor cylinder 4 during operation in relation to solutions known in the art, in which the rotor cylinder 4 is only supported by a bearing at the rear side of the rotor cylinder 4 and a front plate abutting the front surface of the rotor cylinder 4.

Secondly, the increased depth of the stator housing 2 allows for using wider rotor blades 5-7, if they are provided with notches 31 for the protrusion of the front bearing block 35 as is the case in the present invention. For similar dimensions of the inlet 16 for filling material 19 and of the channel between the supply opening 14 for consumer ice mass 18 and the outlet opening 15, this results in increased areas of the shoulders of the rotor blades 5-7. In this context, the word "shoulders" is to be understood as the parts of the outermost transverse edges 30 (see FIGS. 6a-6c) of the rotor blades 5-7, which are in contact with the curved surface defining the cylinder-like cavity 3 when the blades 5-7 pass the inlet 16 for filling material 19 and the channel between the supply opening 14 for consumer ice mass 18 and the outlet opening 15. Especially when passing the inlet 16 for filling material 19, an increased area of these shoulders result in reduced wear of the rotor blades 5-7, because the force with which they are pressed against the curved surface defining the cylinder-like cavity 3 is rather high due to the upward pressure (typically 6-10 bar) from the ice mass 18 on the other end of the rotor blades 5-7.

FIGS. 6a-6c illustrate the contours of the three rotor blades 5-7, respectively, according to an embodiment of the invention. The rotor blades 5-7 are provided with rectangular notches 26, 27 allowing the three rotor blades 5-7 to engage mutually and to move in relation to one another within the rotor cylinder 4. The inwardly-facing transverse surfaces 29 of the notches 26, 27 limit these movements for the individual rotor blade 5-7.

The rotor blade 5 in FIG. 6a is provided with a front-side notch 26, and the rotor blade 7 in FIG. 6c, is provided with a rear-side notch 27, whereas the rotor blade 6 in FIG. 6b is provided with both a rear-side 26 and a front-side notch 27. With the notches 26, 27, connection pieces 28 are formed between the two end parts of each of the rotor blades 5-7, respectively, which end parts alternately project from the rotating rotor cylinder 4 during operation of the arrangement 1.

Apart from these motion-allowing and motion-limiting notches 26, 27, each of the rotor blades 5-7 are provided with a wider notch 31 on the front side for making room for the front bearing block 35 protruding into the rotor cylinder 4 and into these notches 31 for supporting the rotor cylinder 4 from the front side.

FIG. 7 illustrates the mechanical interactions of the three rotor blades 5-7 shown in FIGS. 6a-6c. It is seen how the design of the rotor blades 5-7 allows them to fit together almost like pieces of a jigsaw puzzle and at the same time enabling them to move for a certain distance along their respective longitudinal axes. This figure also shows how room is made for the front bearing block 35 (not shown in this figure) by the three notches 31 designed therefore.

In some cases, especially if the production tolerances are not sufficiently precise, a problem may arise due to the air that is inevitably fed together with the filling material 19 through the inlet 16 to the relevant inlet cells 8-13. The content of encapsulated air in the cells 8-13 may be pressed into the ice mass 18 forming uncontrolled air pockets in the outgoing flow of material through the outlet opening 15. This is extremely unfortunate for the further course, e.g. in connection with a subsequent dosing to freezing moulds or extrusion for the formation of ice items with fixed length and expected fixed weight or "fillness".

The entrance of ice mass 18 into the cells 8-13 results in an increase in the pressure of the air content in the cell, which may make it necessary for air to be evacuated from the cell, e.g. through a fine-meshed wall section of the stator housing. However, for various reasons this is not a particular attractive solution.

A feeding of the filling material under vacuum could be considered, but solutions of this type will generally be all too expensive regarding both plant and operation costs, among other things because no requirements are made otherwise regarding extreme sealing in the unit.

In some embodiments of the present invention, a more attractive solution has been obtained by arranging the rotor blades 5-7 as controlled airing valves, for instance by configuring these plates 5-7 with recesses 17 extending outwards from the transverse edges 29 of the front-side 26 and rear-side 27 notches of the rotor blades 5-7 as illustrated in FIGS. 8a-8b.

In their most displaced positions, for instance between the cells 8 and 9 as illustrated in FIG. 2, the rotor blades 5-7 will project so far out from the rotor cylinder 4 that a part of the recesses 17 (represented by the non-hatched parts of the rotor blades 5-7 in FIG. 2) will appear as holes lying outside the surface of the rotor cylinder 4. This means that the above-mentioned surplus air from the cell 9 can be pressed unhindered up through these holes 17 to the upper, already air-filled space 8 at the inlet opening 16 for the filling material 19. Therefore, only an acceptable minimum of air is transferred further to the cell 10 and thereby to the departing product 20. The concerned holes 17 will be effectively closed during the subsequent course of rotation, so that they do not give rise to other possible undesired effects in other phases of the rotation.

FIG. 9a shows another embodiment of a rotor blade 5 according to the invention, wherein two sets of recesses 21 extend from the outer transverse surfaces 30 of the rotor blade 5. These recesses 21 serve their purpose solely by forming openings through the rotor blades 5-7 between adjacent cells 8-13.

In yet another similar embodiment, as illustrated in FIG. 9b, these openings can be configured as holes 22 through the rotor blades 5-7. In this figure, the rotor blade 5 is shown from the front and from the side with two sets of three through-going holes 22 placed near the outermost transverse edges 30 of the rotor blade 5. As illustrated in the figure, the through-going holes 22 may be made conical in order to avoid that any ice mass 18 or particulate filling 19 gets stuck within the holes 22.

Apart from increasing the area of the shoulders of the rotor blades 5-7 by using wider rotor blades 5-7 as described above, the effective area for obtaining the pressure from the ice mass 18 may also be increased by forming the end surfaces of the rotor blades 5-7 appropriately.

FIG. 10 illustrates an embodiment of a rotor blade 5, in which this effect has been achieved by forming the end surface of the rotor blade 5 as a circular arc of radius R1, the centre point of which is placed slightly within the rotor blade 5 shortly behind the front surface of the blade 5.

The optimal radius R1 depends on the dimensions of the cylinder-like cavity 3 and of the rotor blade 5, but values between 5 mm and 20 mm, preferably between 10 mm and 15 mm, will often result in the largest reduction of the wear of the rotor blade 5.

The edge between the end surface and the front surface of the rotor blade 5 as seen in relation to the rotational movement of the rotor blade 5 is formed by another circular arc. In this case, the radius R2 is chosen to be rather small, such as about 1 mm, in order to obtain a scraping effect of the rotor blade 5 against the curved surface defining the cylinder-like cavity 3.

The other edge between the end surface and the rear surface of the rotor blade 5 as seen in relation to the rotational movement of the rotor blade 5 is less critical and may be formed by a circular are of, for instance, 2 mm.

LIST OF REFERENCE NUMBERS

1. Arrangement for the mixing-in of particulate filling
2. Stator housing
3. Cylinder-like cavity in the stator housing
4. Eccentrically housed rotor cylinder
5. First rotor blade of the rotor
6. Subsequent rotor blade of the rotor
7. Last rotor blade of the rotor
8. First cell between successive rotor blades in direction of rotation (primary inlet cell)
9. Cell between successive rotor blades
10. Cell between successive rotor blades (primary mixing-in cell)
11. Cell between successive rotor blades
12. Cell between successive rotor blades
13. Cell between successive rotor blades
14. Supply opening for consumer ice mass
15. Outlet opening
16. Inlet for filling material
17. Recesses
18. Ice mass
19. Filling material
20. Ice mass with mixed-in filling material
21. Upper recesses
22. Through-going holes
23. Channel in rotor for first rotor blade
24. Channel in rotor for subsequent rotor blade
25. Channel in rotor for last rotor blade
26. Front-side notch in rotor blade
27. Rear-side notch in rotor blade
28. Connection piece in rotor blade
29. Transverse edges of the notches
30. Outermost transverse edges of the rotor blades.
31. Notch for front bearing block
32. Rear bearing surface
33. Front bearing surface
34. Front cover
35. Front bearing block
36. Drive shaft for rotor cylinder
R1. Radius of circular arc forming end surface of rotor blade
R2. Radius of circular arc forming edge between end surface and front surface of rotor blade
R3. Radius of circular arc forming edge between end surface and rear surface of rotor blade

The invention claimed is:

1. An arrangement for mixing of particulate filling material into a consumer ice mass, the arrangement comprising:
   a housing including:
      at least one supply opening for the consumer ice mass;
      at least one inlet for the particulate filling material to a cavity in the housing; and
      an outlet opening; and
   a rotor cylinder assembly having:
      a rotor cylinder; and
      a first rotor blade, a second rotor blade and a third rotor blade for the mixing-in of the consumer ice mass and the particulate filling material by rotation, wherein:
the first, second, and third rotor blades are at least partially within the rotor cylinder and create a number of cells in the cavity by being pressed against the surface of the cavity,
the rotor cylinder is supported from two opposing sides of the cavity by bearings in the form of a rear bearing and a front bearing,
the first rotor blade has a first notch configured to accommodate the second blade and the third blade, and a second notch configured to accommodate the front bearing,
the second rotor blade has a first notch configured to accommodate the first rotor blade, a second notch configured to accommodate the third blade, and a third notch configured to accommodate the front bearing, and
the third rotor blade has a first notch configured to accommodate the first rotor blade and the second rotor blade, and a second notch configured to accommodate the front bearing.

2. The arrangement according to claim 1, wherein the first and second notches of the first blade are arranged on the same side of the first blade.

3. The arrangement according to claim 2, wherein the first blade is substantially flat on the opposite side of where the first and second notches of the first blade are arranged.

4. The arrangement according to claim 1, wherein the first notch of the second blade is arranged on a first side of the second blade, and the second and third notches of the second blade are arranged on a second side of the second blade that is opposite the first side of the second blade.

5. The arrangement according to claim 1, wherein the first and second notches of the third blade are arranged on opposite sides of the third blade.

6. The arrangement according to claim 1, wherein at least a part of the front bearing protrudes into the rotor cylinder and into respective notches in each of the first, second, and third rotor blades.

7. The arrangement according to claim 1, wherein the center of the rotor cylinder is displaced in relation to the center of the cavity.

8. The arrangement according to claim 7, wherein the center of the rotor cylinder is displaced horizontally in relation to the at least one inlet.

9. The arrangement according to claim 1, wherein the first, second, and third rotor blades are mutually displaced by 60 degrees.

10. A rotor cylinder assembly for use in an arrangement for mixing of particulate filling material into a consumer ice mass, the rotor cylinder comprising:

a rotor cylinder; and
a first rotor blade, a second rotor blade and a third rotor blade for the mixing-in of the consumer ice mass and the particulate filling material by rotation,
wherein:
the first, second, and third rotor blades are at least partially within the rotor cylinder,
the first rotor blade has a first notch configured to accommodate the second blade and the third blade, and a second notch configured to accommodate a front bearing of the arrangement,
the second rotor blade has a first notch configured to accommodate the first rotor blade, a second notch configured to accommodate the third blade, and a third notch configured to accommodate the front bearing, and
the third rotor blade has a first notch configured to accommodate the first rotor blade and the second rotor blade, and a second notch configured to accommodate the front bearing.

11. The rotor cylinder assembly according to claim 10, wherein the first and second notches of the first blade are arranged on the same side of the first blade.

12. The rotor cylinder assembly according to claim 11, wherein the first blade is substantially flat on the opposite side of where the first and second notches of the first blade are arranged.

13. The rotor cylinder assembly according to claim 10, wherein the first notch of the second blade is arranged on a first side of the second blade, and the second and third notches of the second blade are arranged on a second side of the second blade that is opposite the first side of the second blade.

14. The rotor cylinder assembly according to claim 10, wherein the first and second notches of the third blade are arranged on opposite sides of the third blade.

15. The rotor cylinder assembly according to claim 10, wherein at least a part of the front bearing protrudes into the rotor cylinder and into respective notches in each of the first, second, and third rotor blades.

16. The rotor cylinder assembly according to claim 10, wherein the center of the rotor cylinder is displaced in relation to a center of a cavity of the arrangement.

17. The rotor cylinder assembly according to claim 16, wherein the center of the rotor cylinder is displaced horizontally in relation to at least one inlet of the arrangement.

18. The rotor cylinder assembly according to claim 10, wherein the first, second, and third rotor blades are mutually displaced by 60 degrees.

* * * * *